United States Patent [19]
Davis et al.

[11] Patent Number: 6,014,673
[45] Date of Patent: Jan. 11, 2000

[54] SIMULTANEOUS USE OF DATABASE AND DURABLE STORE IN WORK FLOW AND PROCESS FLOW SYSTEMS

[75] Inventors: James W. Davis, Sunnyvale; Weimin Du, San Jose; Ming Chien Shan, Saratoga; Nicholas Sheard, Palo Alto, all of Calif.

[73] Assignee: Hewlett-Packard Company, Palo Alto, Calif.

[21] Appl. No.: 08/853,699

[22] Filed: May 13, 1997

Related U.S. Application Data

[60] Provisional application No. 60/032,567, Dec. 5, 1996.

[51] Int. Cl.$^7$ ..................................................... G06F 17/30
[52] U.S. Cl. ............................................... 707/202; 705/8
[58] Field of Search ................................... 707/3, 2, 102, 707/103, 202, 203, 204, 10; 395/200.53, 200.31; 709/201; 714/15; 705/8

[56] References Cited

U.S. PATENT DOCUMENTS

| | | |
|---|---|---|
| 5,287,501 | 2/1994 | Lomet ...................................... 707/202 |
| 5,412,806 | 5/1995 | Du et al. ..................................... 707/2 |
| 5,504,899 | 4/1996 | Raz ............................................ 707/10 |
| 5,524,241 | 6/1996 | Ghoneimy et al. ...................... 707/202 |
| 5,546,571 | 8/1996 | Shan et al. .................................. 707/3 |
| 5,581,691 | 12/1996 | Hsu et al. .................................. 714/15 |
| 5,627,764 | 5/1997 | Schutzman et al. ............... 395/200.37 |
| 5,675,785 | 10/1997 | Hall et al. ............................... 707/102 |
| 5,694,591 | 12/1997 | Du et al. ..................................... 707/2 |
| 5,787,437 | 7/1998 | Potterveld et al. ..................... 707/103 |
| 5,809,507 | 9/1998 | Cavanaugh, III ....................... 707/103 |
| 5,826,239 | 10/1998 | Du et al. ..................................... 705/8 |
| 5,870,545 | 2/1999 | Davis et al. ....................... 395/200.31 |
| 5,870,763 | 2/1999 | Lomet et al. ........................... 707/202 |
| 5,937,388 | 8/1999 | Davis et al. ................................. 705/8 |

*Primary Examiner*—Thomas G. Black
*Assistant Examiner*—Charles L. Rones

[57] ABSTRACT

A method and apparatus for reliable high-speed access to a database system that stores system data in a non-volatile database, stores current data in an online database object cache, the current data reflecting at least a portion of the system data in the non-volatile database and the online database object cache providing the database system with the capability of querying and updating the current data in the online database object cache, logging each message in the database system as an entry in a durable log file, and periodically committing the current data in the online database object cache to the non-volatile database.

14 Claims, 12 Drawing Sheets

SIMULTANEOUS USE OF DATABASE AND DURABLE STORE IN WORK FLOW AND PROCESS FLOW SYSTEMS

CROSS-REFERENCE TO RELATED APPLICATION

This patent application is a continuation application of provisional application no. 60/032,567, filed on Dec. 5, 1996, by Weimin Du et. al., and entitled WORKFLOW/PROCESS FLOW PROCESS MANAGEMENT SYSTEM, the disclosure of which is incorporated herein by reference.

This patent application is related to a commonly-assigned patent application entitled SYSTEM AND METHOD FOR PERFORMING FLEXIBLE WORKFLOW PROCESS EXECUTION IN A DISTRIBUTED WORKFLOW MANAGEMENT SYSTEM, Ser. No. 08/82/940, filed on Mar. 21, 1997, currently pending, the disclosure of which is incorporated herein by reference.

This patent application is also related to a commonly-assigned patent application entitled SYSTEM AND METHOD FOR PERFORMING FLEXIBLE WORKFLOW PROCESS COMPENSATION IN A DISTRIBUTED WORKFLOW MANAGEMENT SYSTEM, U.S. Pat. No. 5,870,545, issued on Feb. 9, 1999, the disclosure of which is incorporated herein by reference.

This patent application is related to a commonly-assigned patent application entitled DISTRIBUTED WORKFLOW RESOURCE MANAGEMENT SYSTEM AND METHOD, U.S. Pat. No. 5,826,239, issued on Oct. 20, 1998, the disclosure of which is incorporated herein by reference.

BACKGROUND OF THE INVENTION

This invention relates to a method and apparatus for implementing simultaneous usage of a database and durable storage of database updates and more particularly to simultaneous usage of a database and durable storage for a workflow and process flow management system.

Database systems generally provide atomic, consistent, isolated, and durable (ACID) properties to the systems making use of them. These ACID properties are invaluable to applications, allowing them great freedom and considerable simplification in programming with undiminished reliability.

Database systems typically require that a durable log mechanism be supported by the database system services that provide access to the data. These systems layer their ACID functionality atop this durable logging feature.

Database systems provide the needed reliability, but at substantial performance cost. To assure maximal reliability using a database management system, all updates must be durable (permanent) before acting upon them. This generally requires that the database updates be committed.

A conventional database system maintains the data in a durable storage mechanism, such as a disk drive. The database system will also typically have a non-durable copy of an active portion of the database in a volatile memory cache. The data in volatile memory can be rapidly accessed, but can be destroyed and lost in the event of a system crash, program failure or similar abnormal termination. To maintain the integrity of the database, updates to the database must be guaranteed to be stored, i.e. committed, in the durable storage mechanism. A commit requires that the database system store all modified data in memory cache to the durable storage mechanism.

However, durable storage requires more access time than cache memory. A process that requests the database system to commit an update transaction must wait for an acknowledgment that the commit was successful. The database system only acknowledges the commit when the data has been updated in durable storage. Frequent commits, therefore, degrade system performance because of the time consumed by processes waiting for acknowledgment from the database system.

A database system can be made reliable by storing all state changes in a durable log file. However, the modified data, as represented by the state changes in the log file, would not be easily accessible and much of the utility of the database system is lost.

One application for database systems is workflow systems. Workflow systems effect business processes by controlling the scheduling and parameters of activities, acquiring their results, and using the results in determining other activities to run. A business process is a description of the sequencing, timing, dependency, data, physical agent allocation, business rule and organization policy enforcement requirements of business activities needed to enact work. Most workflow systems utilizes relational, object-oriented, network or hierarchical database management system to store data relating to the business process.

Workflow systems partition the data involved in the execution of a business process into three categories.

Process Specific Data (PSData) are those data used in effecting a business process that are of no concern to any of the individual activities contained therein.

Application Specific Data (ASData) are those data used in effecting a business process that are of concern to one or more of the activities therein but not of concern to the scheduling or controlling of the activities.

Process Relevant Data (PRData) are those data used in effecting a business process that are of concern to one or more of the activities therein and to the scheduling or controlling of those activities and may include system queues.

Workflow systems define business processes through one or more definition languages. These languages may be fundamentally graphical in nature, or may resemble concurrent programming languages. They can be closely tied to software design methodologies and tools.

In general, workflow systems perform a wide range of tasks. For instance, they can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status.

In addition to the data above, it is useful for some workflow process applications to have access to historical data regarding state changes within the system. Historical data takes the form of an audit trail for completed workflow processes and is useful to the collection of statistical data for process and resource bottleneck analysis, flow optimization and automatic workload balancing. While workflow systems need full ACID properties over some of their data, they do not need them for the historical data. The existing workflow systems that use databases either record historical data along with current data in their database, discard the historical data entirely, or store it non-durably.

Since data in a workflow system represents work that needs to be done or has already been done, the database generally needs to provide a high degree of reliability. Loss of the data related to a completed work event can mean the loss of the work performed by the work event. It is also quite useful for some applications to provide convenient access to historical data from the system.

It is therefore desirable to provide a high degree of reliability in a database by durably storing updated data and to simultaneously provide rapid access to the database. It is particularly desirable in workflow systems to not lose data modifications related to work assignments. It is also desirable in a workflow system to durably store the historical data of the system and provide convenient access to the data.

SUMMARY OF THE INVENTION

The present invention is a database system and durable store method that partitions information into information which needs to be up-to-date online in the database, information which can be brought up-to-date offline in the database, and information which need never be stored into the database, thereby providing substantially guaranteed reliability for the information. All updates are durably stored before being acted upon to provide maximal reliability. Such updates are stored by recording the message traffic through a database engine in a log file whereby all updates originate from such a message. Database changes need not be durably recorded immediately to avoid incurring a penalty. Offline procedures store the historical data from the log file into a relational database allowing the historical data to be queried.

The online use of the log file eliminates the requirement that the system commit all database changes before acting upon any changed state. This dramatically increases the throughput of the system. The offline relational storage of historical data allows users convenient and efficient access to the data. In the event of a system failure, all externally knowable states can be recovered whereby all the system states upon which any action has been performed is restored.

One feature of the present invention is in the application of the "write to log first" principle to provide reliability to information not being directly committed into a database. Another feature of the present invention is durable logging of state changes without requiring online database commits. Yet another feature of the present invention is the use of an offline relational database for historical purposes. And still another feature of the present invention is system recovery which guarantees no knowable state is lost.

The foregoing and other objects, features and advantages of the invention will become more readily apparent from the following detailed description of a preferred embodiment of the invention which proceeds with reference to the accompanying drawings.

DETAILED DESCRIPTION

An embodiment of the present invention will be discussed in the context of an experimental workflow system called HP OpenPM.

HP OPENPM (an open, enterprise-capable, object-oriented workflow process management system)(hereinafter simply referred to as HP OpenPM).

Figure 1:
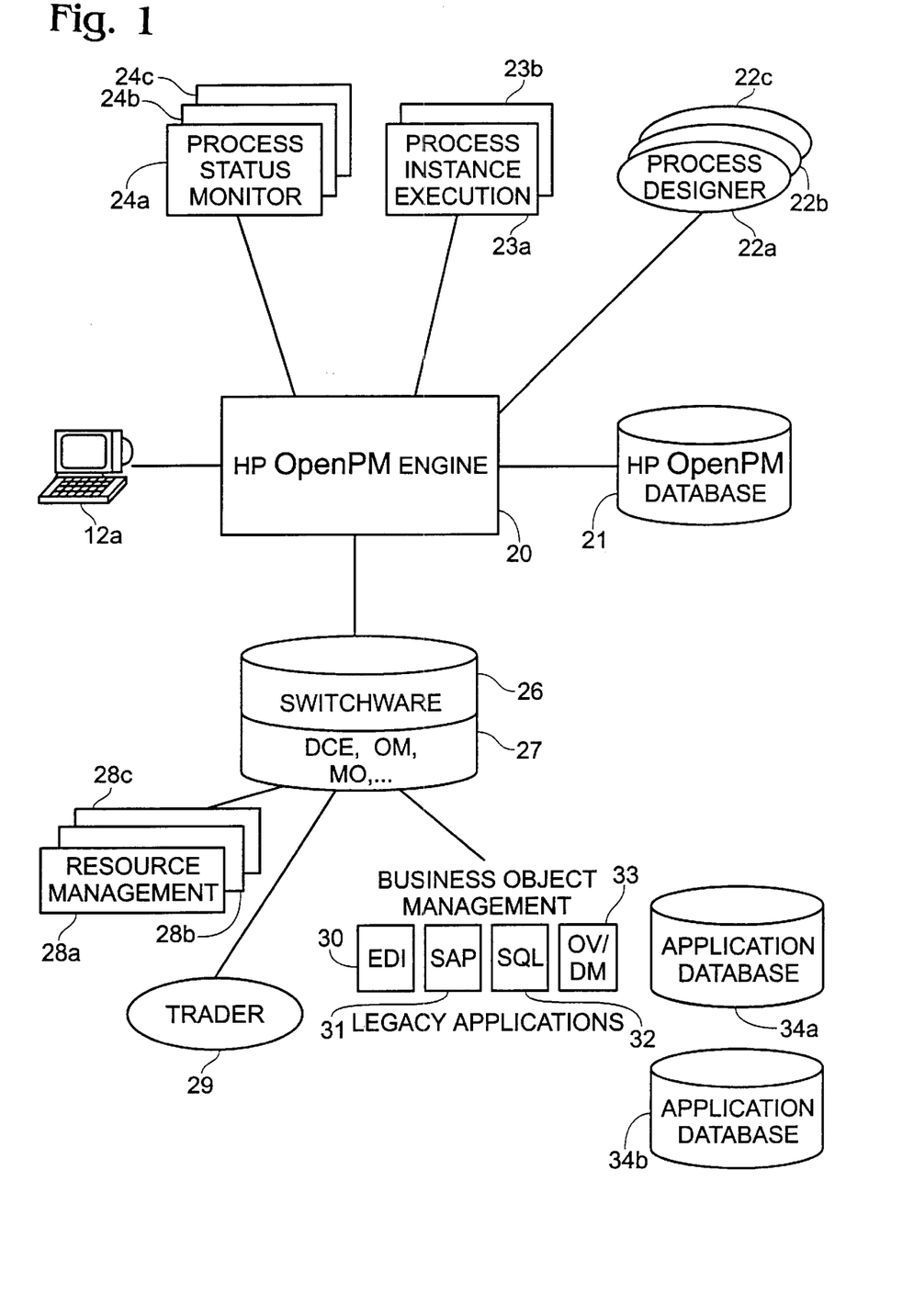
FIG. 1 is a block diagram of a hardware and software machine showing the architecture of an example of process flow management middleware employing the present invention.

FIG. 1 is a block diagram of the hardware and software machine for the HEWLETT PACKARD (HP) OpenPM system which is middleware suitable for a workflow system architecture employing the present invention. HP OpenPM is an open, enterprise-capable, object-oriented workflow process management (WFPM) system developed at HEWLETT PACKARD Laboratories, Palo Alto, Calif., for managing business activities that support complex enterprise processes in a distributed, heterogeneous computing environment. Whereas the present invention of simultaneous use of database and durable store in a workflow process management system is described herein in the context of the HP OpenPM, it may also be implemented in the context of other workflow management systems, such as IBM Flowmark.

HP OpenPM provides a generic framework and complete set of services for workflow process management using a middleware-based approach with an emphasis on performance, availability, scalability and system robustness.

Briefly, HP OpenPM provides the optimized database access and commitment features of the present invention in an open system adhering to the OMG (OBJECT MANAGEMENT GROUP) CORBA (Common Object Request Broker Architecture) communications infrastructure with a Workflow Management Coalition-standard interface.

The overall architecture of the HP OpenPM system is depicted in FIG. 1. The core is the HP OpenPM engine 20, which supports five interfaces. The interfaces enable the HP OpenPM engine 20 to interact with workflow process designer 22*a–c*, workflow process instance execution 23*a–b*, workflow process monitor 24*a–c*, resource management 28*a–c* and business object management modules 30, 31, 32, 33. In addition, worldwide web client support is provided by each individual network node 12*a* which can execute middleware modules expressed in platform-independent languages, such as Java Applets and HTML code. An HP OpenPM database 21 is maintained on a centralized WFPM server for use by the HP OpenPM engine 20.

A workflow process is specified by the process design modules 22a–c via the workflow process definition interface. An instance of a workflow process can be started, controlled or stopped by the process instance execution modules 23a–b via the process execution interface. Status information for each process instance and load information for the WFPM system 10 can be queried using the process status monitor modules 24a–c via the process status monitoring interface. The resource management interface is used to allocate, at run time, execution resources to a task, according to the policies defined by the organization (including authorization and authentication) and the availability of the resources using the resource management modules 28a–c. Interaction with the external world, such as invoking an application, controlling an instrument or delivering a work order to a person's electronic mail in-box, is performed by the various business object management modules 30, 31, 32, 33.

HP OpenPM Process Model

Figure 2:
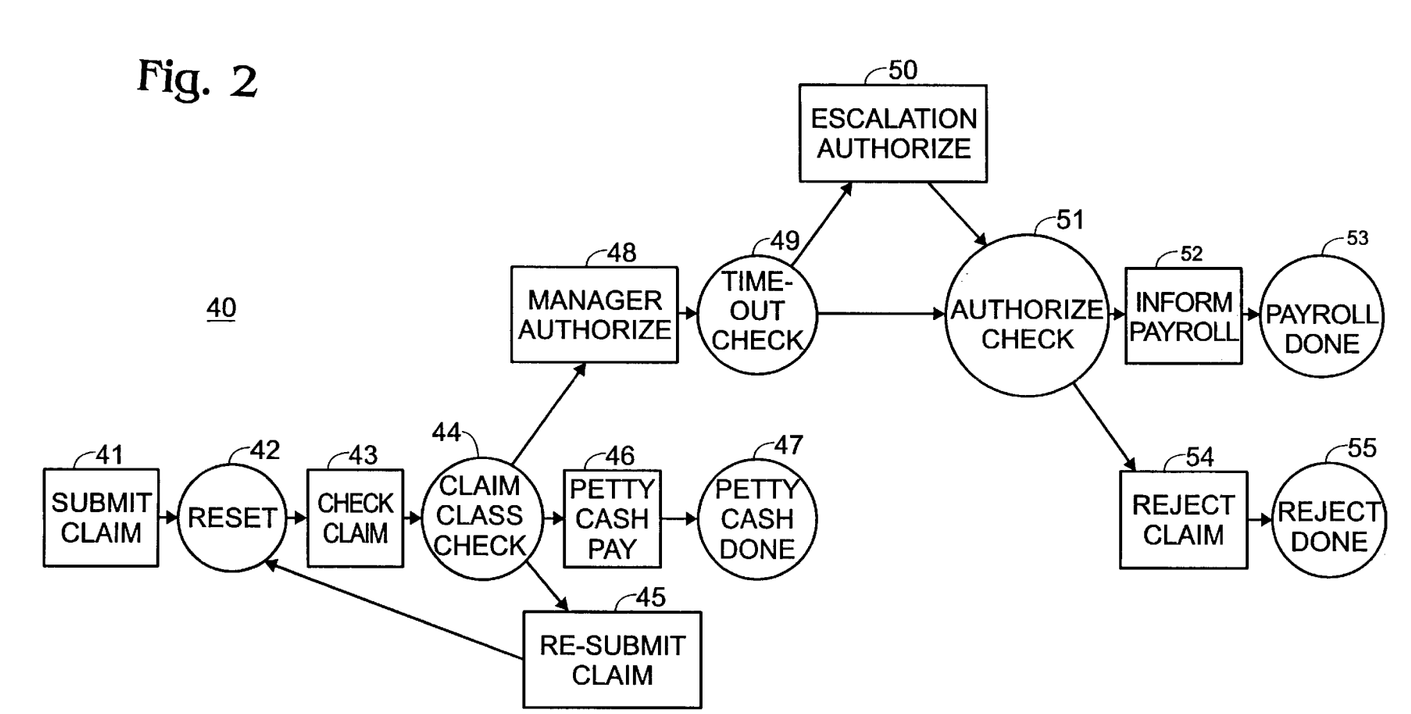
FIG. 2 is a diagram showing an example of a process flow diagram for a business process flow managed by the system of FIG. 1.

In general, a workflow process is a description of the sequencing, timing, dependency, data, physical agent allocation, business rule and organization policy enforcement requirements of business activities needed to enact work. FIG. 2 shows, by way of example, a workflow process which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the normal execution flow of process activities and form a directed acyclic graph 40. Successful completion of a node at the source end of a forward arc triggers the starting of the node at the destination end of the forward arc.

Reset arcs are used to support repetitions or explore alternatives in a workflow process. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects and provision of input data for the business objects and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of a process. A process activity is mapped to the invocation of an operation on business objects during the execution of the process and each process activity can represent a manual operation by a human or a computerizable task to execute legacy applications 30, 31, 32, 33 (shown in FIG. 1), access application databases 34a, 34b (also shown in FIG. 1), control instrumentation, sense events in the external world or effect physical changes. A process activity definition includes a forward activity and optionally, a compensation activity, a cancel activity, a resource management activity, timeout and deadline information and input and output data.

Rule nodes 42, 44, 47, 49, 51, 53, 55 are used to specify workflow processes that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to fired and performs or requests its associated activity. When the inward arc is fired on a work node 41 in the fired state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process is a process data template defined by a workflow process designer module 22a (shown in FIG. 1). The process data template is used to provide initial data for the creation of process instances. At run time, based on the process data template and read/write lists of activities defined in a workflow process, HP OpenPM will generate a case packet for each process instance to facilitate data passing between activities and the HP OpenPM engine 20.

HP OpenPM Process Execution

Figure 3:
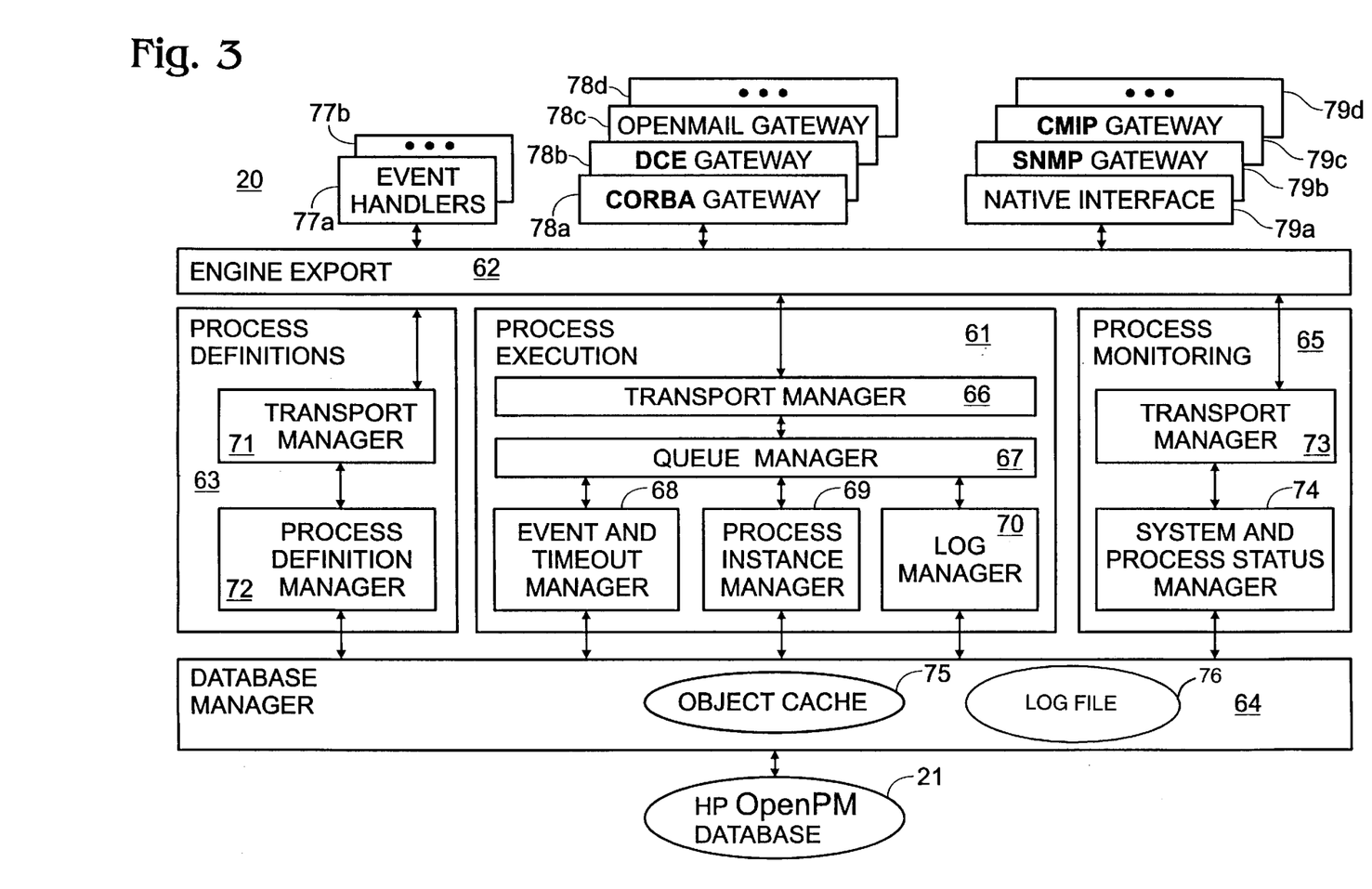
FIG. 3 is a block diagram of an embodiment of a workflow process software engine that coordinates execution flow of the managed process.
Figure 4:
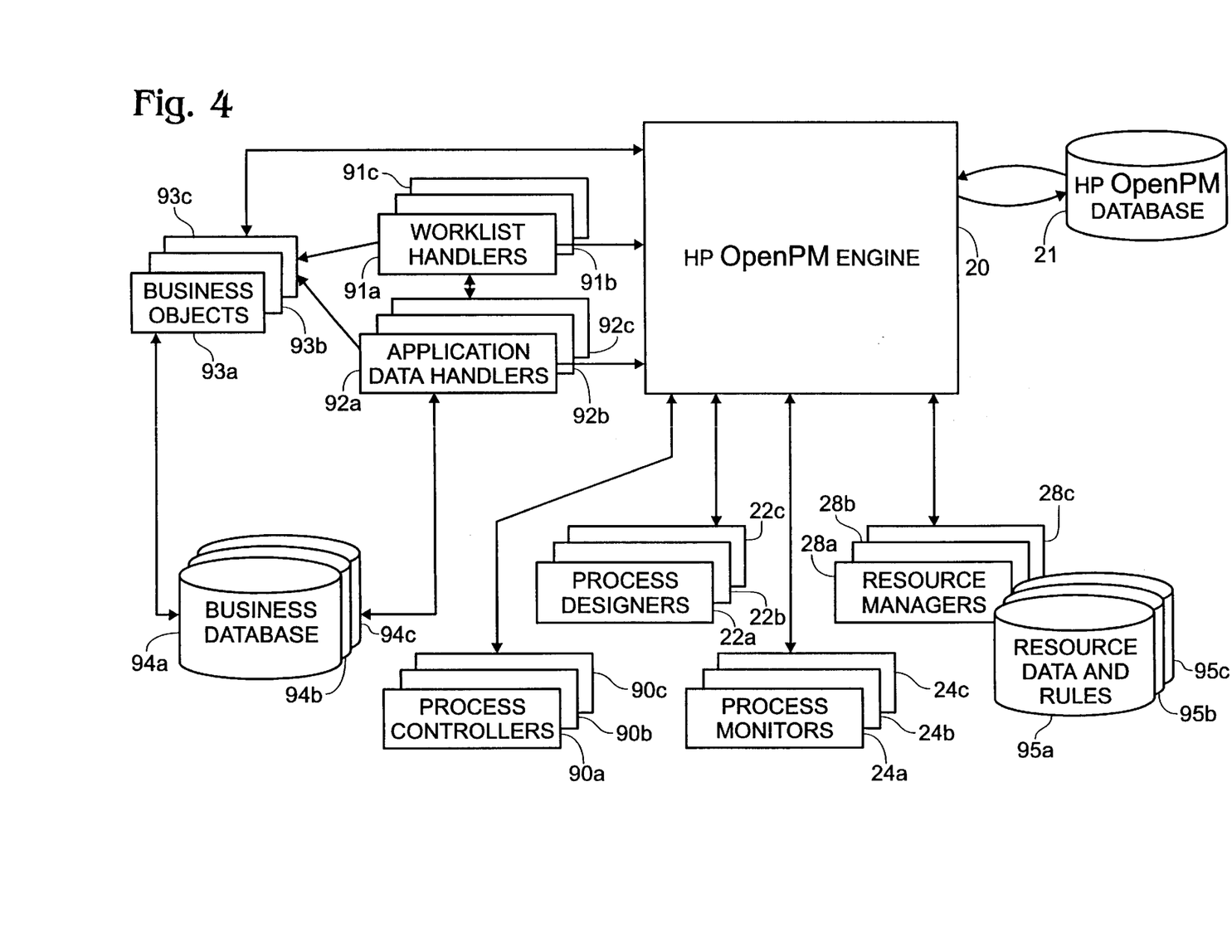
FIG. 4 is a block diagram of the system architecture with worklist handler and application data handler features.

FIG. 3 is a block diagram of an embodiment of a workflow process software engine, such as the HP Open PM engine 20, that coordinates execution flow of the workflow processes. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 (examples shown in FIG. 2) according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged in log file 76 to facilitate forward rolling of incomplete workflow processes at system restart time in the event of a system failure, as discussed in greater detail below, or to facilitate a support activity compensation process in the case of a business activity failure. In addition, the HP OpenPM engine 20 allows flexible specification of compensation scopes and actions, such as compensation activity or cancel activity, to support various application needs.

In the HP OpenPM engine 20, different versions of similar workflow processes are supported by the engine 20 under the concept of a process group. A user can designate a particular version as the default version to be used when no specific version is requested at the time a workflow process instance is created.

To monitor the progress of running business activities and support system management, the HP OpenPM engine 20 maintains all events in comprehensive log file 76 by using a log manager 70 and provides a native interface 79a as well as an SNMP 79b and CMIP 79c gateways to facilitate integration with the HP OpenView environment. The formats and contents of the logged information can be customized to support specific application needs.

Figure 5:
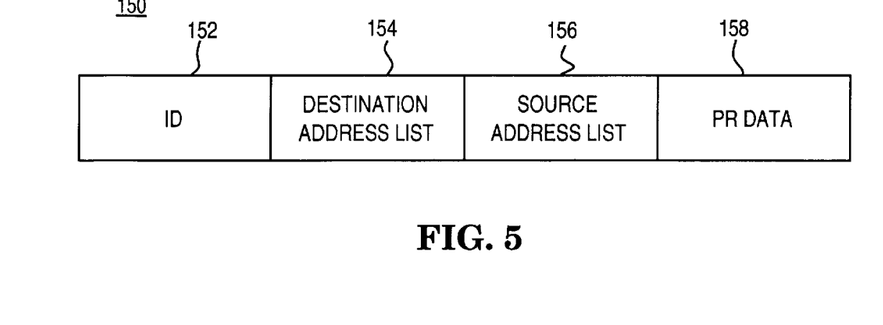
FIG. 5 is a diagram showing an example format of a message sent and received by the workflow process software engine of FIG. 3 according to the present invention.
Figure 6:
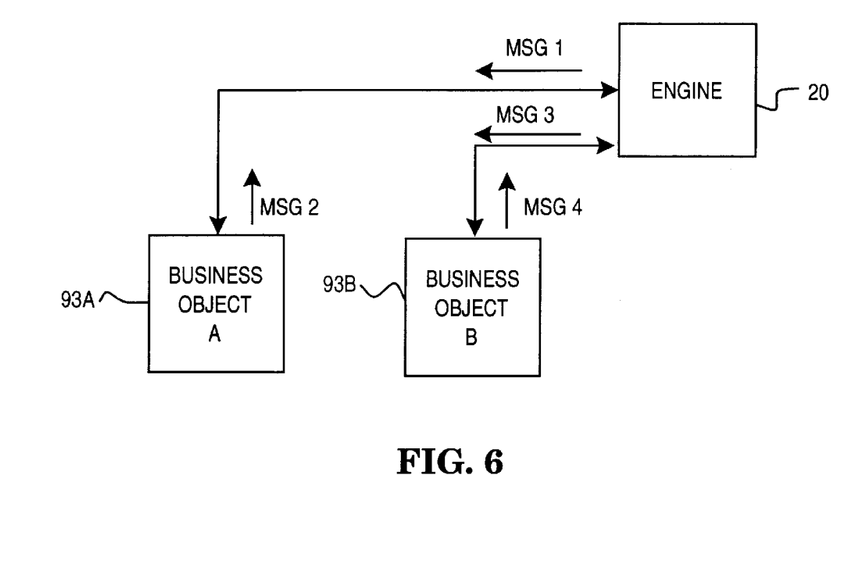
FIG. 6 is a diagram showing an exchange of message traffic in the workflow process software engine of FIG. 3 according to the present invention.

When a work node is to be executed, the engine 20 sends a resource management request to the appropriate resource manager 28a, 28b or 28c. The response from the resource manager includes an address list that includes the address of each work object to be used to effect the work. The engine 20 then creates a message 150, as shown in FIG. 5, containing a message ID 152, the appropriate data 158, such as PRData, setting destination address list 154 of the message to the address list from the resource manager, the source address list 156 to an address of the engine 20, and dispatches the message to the first address on the destination address list 154.

Figure 7A:
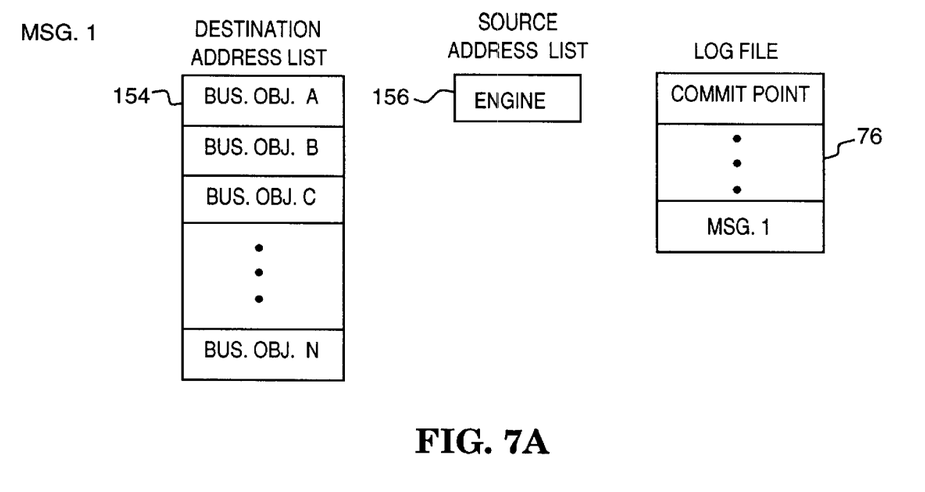
FIGS. 7A–D are diagrams of the effect of the messages in the example of FIG. 6 on the destination address list, source address list and log file.
Figure 7B:
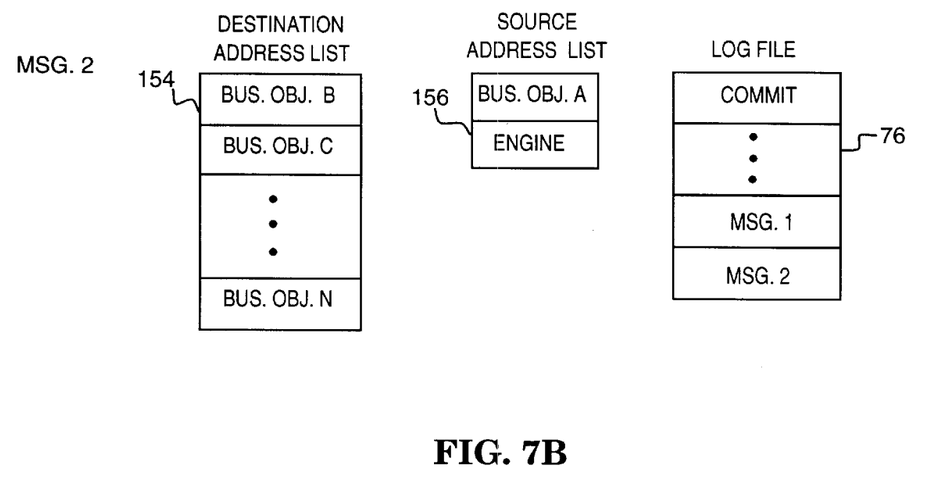
Figure 7C:
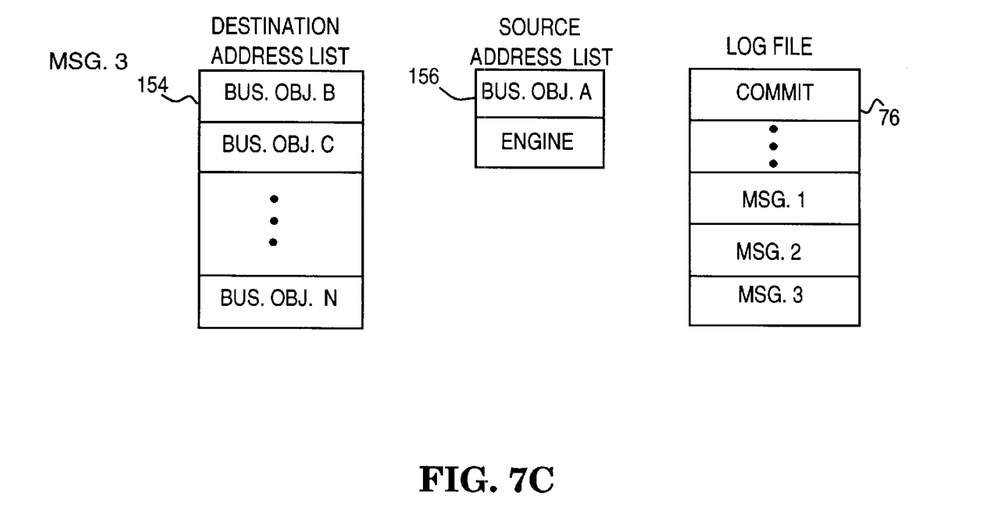
Figure 7D:
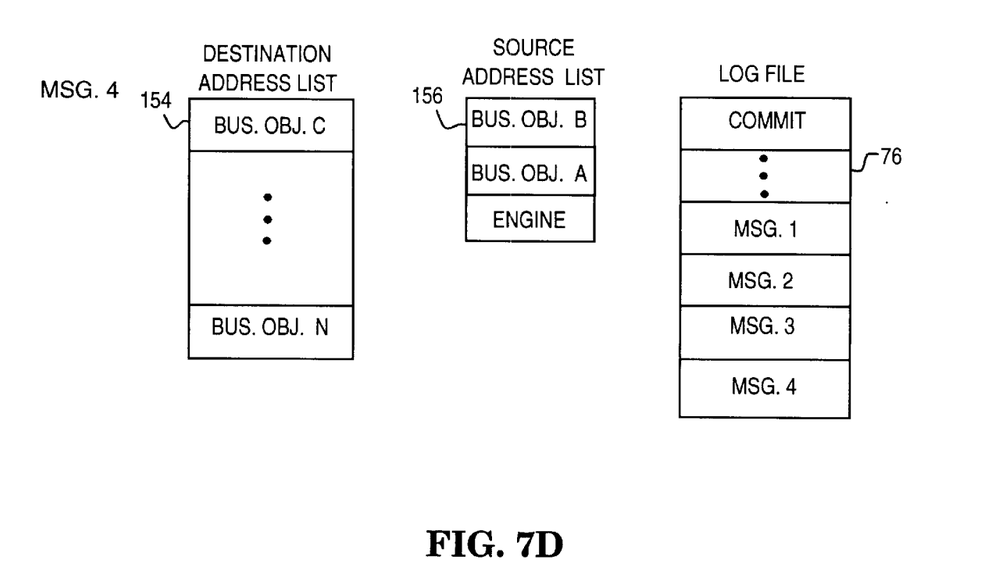
Figure 8:
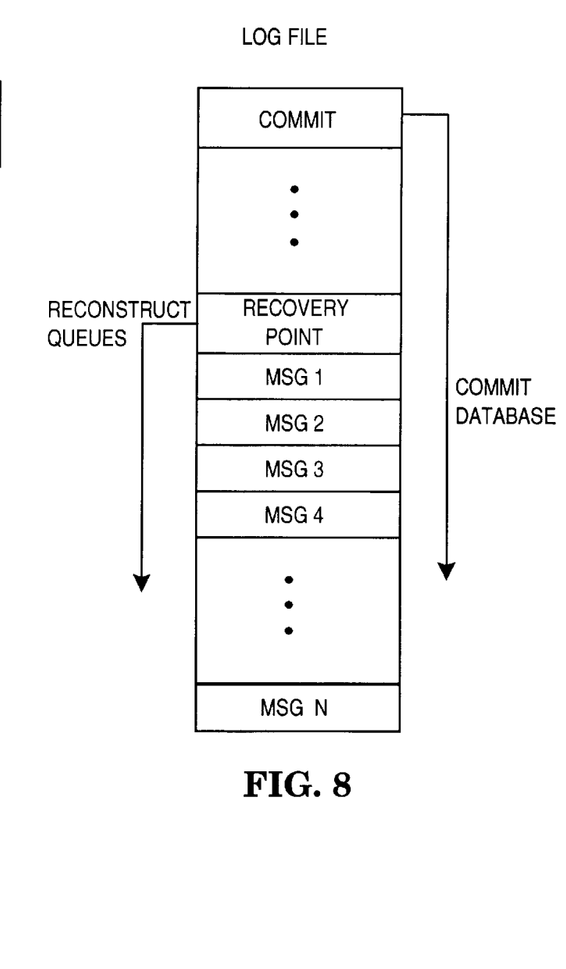
FIG. 8 is an example of a log file generated by the message traffic of FIG. 6 at the time of recovery according to the present invention.

FIGS. 6, 7A, 7B, 7C, 7D and 8 illustrate an example of a series of messages between engine 20 and business objects 93a and 93b. As described above, engine 20 creates Msg1 for transmission to business object 93a. FIG. 7A the destites an example of the destination address list 154 identified by the destination address list 154 contained in Msg1. Destination address list 154 identifies business object 93a as the first object on the list which prompts engine 20 to dispatch Msg1 to business object 93a. Engine 20 places itself on the source address list 156. Msg1 is first logged as an entry in log file 76, then engine 20 transmit Msg1 to business object 93a. Msg 3 and Msg 4 are similarly dispatched and logged as shown in FIGS. 7C and 7D respectively.

Business object 93a executes the work requested by Msg1, removes itself from destination address list 154 and adds itself to the source address list 156, as illustrated in FIG. 7B. Object 93a then creates Msg2 for the next object in destination address list 154, business object 93b, and sends Msg2 back to engine 20 for further dispatch to business object 93b. Msg2 is logged in log file 76 when received by engine 20.

Each object in its turn performs its portion of the work, removes itself from the destination address list 154, insets an appropriate address for itself on the source address list 156 and re-dispatches the message to the new first address on the destination address list 154 until the list is empty.

The addresses in the address list typically denote objects of one of three types in a workflow system.

Business Objects, such as objects 93a–c in FIG. 3, perform the business task that the work node represents.

Application Data Handlers, such as data handlers 92a–92c, provide for the provision of ASData to a Business Object and the storage of updates to ASData at the conclusion of the Business Object's execution.

Worklist Handlers, such as 91a–c in FIG. 3, queue up work and allow users to choose from available work.

Durable Store in the Workflow System

As noted above, a workflow (or processflow) system must durably and reliably record historical data. After a system failure, the system must not reissue any work whose completion had already been reacted to by the Processflow system. It is acceptable to reissue work that the engine has not already reacted to the completion thereof.

To elaborate, if engine 20 is to issue a work request to a work object, such as Msg1 to business object 93a in the scenario above, and after the completion of the work object, as signified by Msg2 in the scenario above, it would issue another work request, Msg3, to business object 93b above that could possibly include parameters that depend on the results of the work done responsive to the first work request, then the engine must receive Msg2 in reply to Msg1 before dispatching Msg3. In the event of a system crash, the engine must react as follows:

If engine 20 crashes before issuing Msg1, it must issue Msg1 upon restart.

If engine 20 crashes after issuing Msg1 but before receiving Msg2 in reply to Msg1, it should reissue Msg1. It must reissue it with a duplicate ID in case the work object had replied during the engine's downtime or immediately prior to its death.

If engine 20 crashes after having issued Msg3 it must not reissue Msg1.

ASData must be maintained in non-volatile mass storage in database 21 so that it is preserved in the event of a crash. However, as noted above, updates to ASData during the course of workflow processing would present a substantial performance penalty if the engine 20 is required to commit the updates in each transaction to avoid losing data in the event of a crash.

In addition, it is useful to preserve the historical data regarding the message and database transactions in the workflow system for both recovery purposes and for applications, such as banking, that require the information for audit purposes. However, using a database system to also store the historical data in the non-volatile storage of database 21 would further aggravate the performance penalty for transactions because the OpenPM engine 20 would also have to commit each historical record or risk losing the information in a system failure.

The architecture of the present invention addresses these problems by using an online database object cache 75 to store current data, which is a volatile version of ASData that reflects recent updates to the ASData in database 21, the durable log file 76 that contains messages representing historical data, and non-volatile storage in database 21.

This split of the data allows the present invention to provide the ability to quickly access the database information including the current data in the object cache 75 with the full power of a relational database. At the same time, the present invention maintains the database information with ACID properties by durably storing database transactions in log file 76 which is then used to recover the database in the event of a system failure, but without performing a commit to non-volatile database 21 for each database transaction.

In addition, the present invention permits database manager 64 to more efficiently schedule disk I/O operations for non-volatile database 21. When a user process updates data in object cache 75, the user process may continue processing without waiting for a commit reply from the database manager 64. Database manager 64 is then free to independently schedule the write of the modified data to the disk containing non-volatile database 21. This permits disk I/O operations for database 21 to be interspersed with the disk operations for other system functions such as computational I/O or network traffic I/O. Database updates that are written to disk do not have to be rewritten to disk when performing a periodic database commit.

Further, offline processes of the present invention may be incorporated to prune the log file 76 and produce a historical information database without impacting the performance of the engine 20. This procedure occurs offline and need not substantially degrade the system throughput. The log file 76 may simultaneously be pruned to include only items since the last checkpoint record.

Entries in log file 76 each contain a backward pointer to the previous record for the same process instance. In the event of restart after system failure, the OpenPM engine 20 replays any entries in log file 76 that are not reflected in the database 21. This provides the reliability that other workflow systems only achieve by committing after each database change but with greater system throughput.

Normal Processing to Support Recovery

Each message inbound to the OpenPM engine 20 is logged in log file 76 and then queued for appropriate processing by the engine. All ASData updates are stored in object cache 75 and logged in log file 76. Each response from engine 20 is also logged. Periodically database manager 64 commits the updates to non-volatile database 21 and logs a Commit point message in log file 76. Because the database changes are periodically committed in a batch, it is not necessary to commit each database transaction.

A database commit can take several forms in the present invention depending on how the database manager 64 is implemented. In one embodiment, database manager 64 schedules a write to disk where non-volatile database 21 resides whenever ASData is updated. The database commit then checks the log file for entries that have not been written to disk, performs the disk write for any entries found, and logs a commit point.

The database manager 64 may also be implemented where all disk writes are performed at commit time. In this case, database manager 64 performs a disk write of each transaction entry recorded in the log file since the last commit point and then logs a commit point. Yet another approach is for database manager 64 to mark the ASData in object cache 75 as updated, in addition to making a log entry, and then writing the updated ASData to non-volatile database 21 at commit time before logging a commit point.

If any queues in the engine are not persistently stored in database 21 then engine 20 periodically generates Recovery point messages. These messages contain the IDs of all non-persistent messages queued for engine processing. Care must be taken in making a queue non-persistent as some OpenPM queues can have substantial populations.

Limits of Recovery

The present invention provides guaranteed at least once behavior. The engine 20 will strive to deliver each message at least once regardless of a failure of the engine. However, the engine may deliver a message more than once. The engine 20 may send replicated messages while restarting after a failure. These messages will faithfully replicate the message IDs of the original messages that they represent, although it is possible that the contents may differ.

The present invention will not replicate messages for which replies have been received and logged. Applications must either correctly tolerate duplicate messages with possibly differing contents or ensure that they do not occur.

The present invention is not capable of independently and robustly surviving certain situations. If the non-volatile database 21 or log file 76 suffer damage the system may not properly recover. Note that a crash before a database commit does not in itself constitute damage because the present invention can recover. Installations requiring robust behavior in the face of such possibilities must consider adding additional mechanisms such as mirrored discs, replicated databases, and the like.

The present invention should robustly survive crashes in which no log entries are lost and no committed data are destroyed.

Specific Recovery

Figure 9:
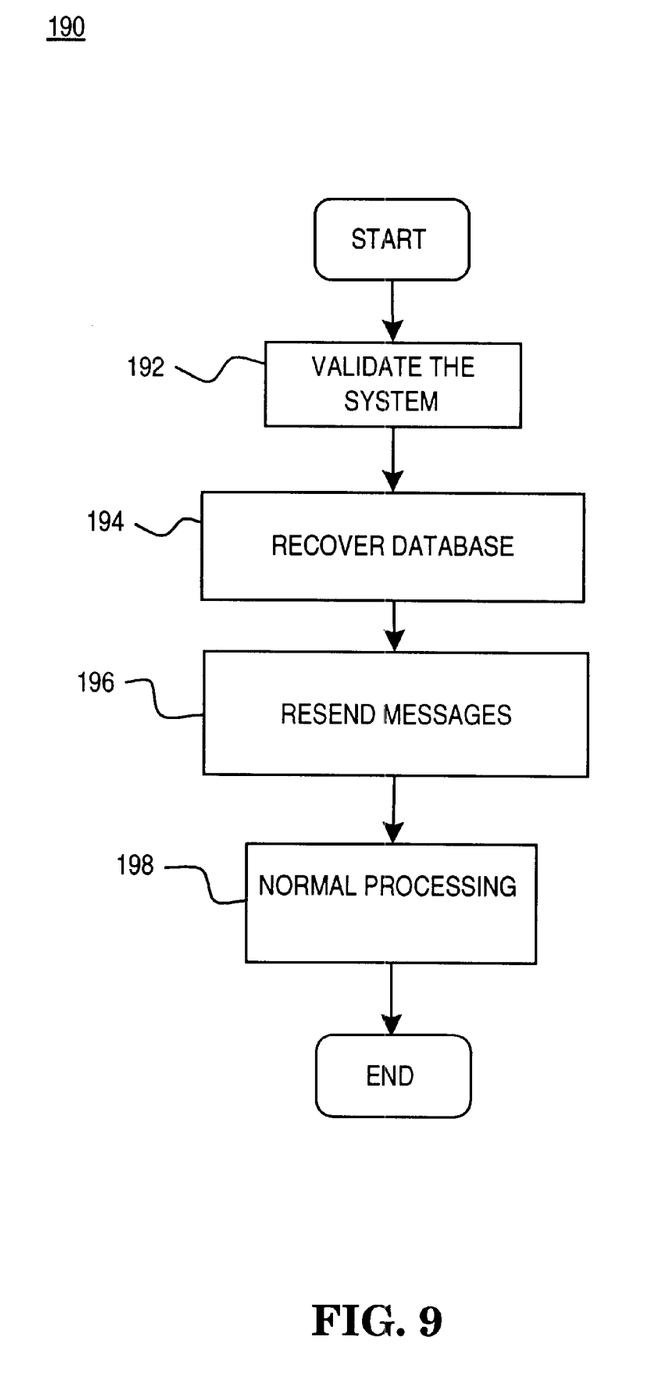
FIG. 9 is a flow diagram of a method of recovery according to the present invention.

The present invention, when implemented in the OpenPM architecture, implements all engine queues within persistent storage in the database. This simplifies the process of recovery. Upon restart the system attempts to reach a state consistent with all of the work performed before the crash which has become externally visible. The system uses a four phase recovery procedure 190 having phases Validate 192, Recover 194, Resend 196, and Normal 198, as illustrated in FIG. 9. Normal 198 is the normal operational state of the system, that is to say that recovery is complete.

Figure 10:
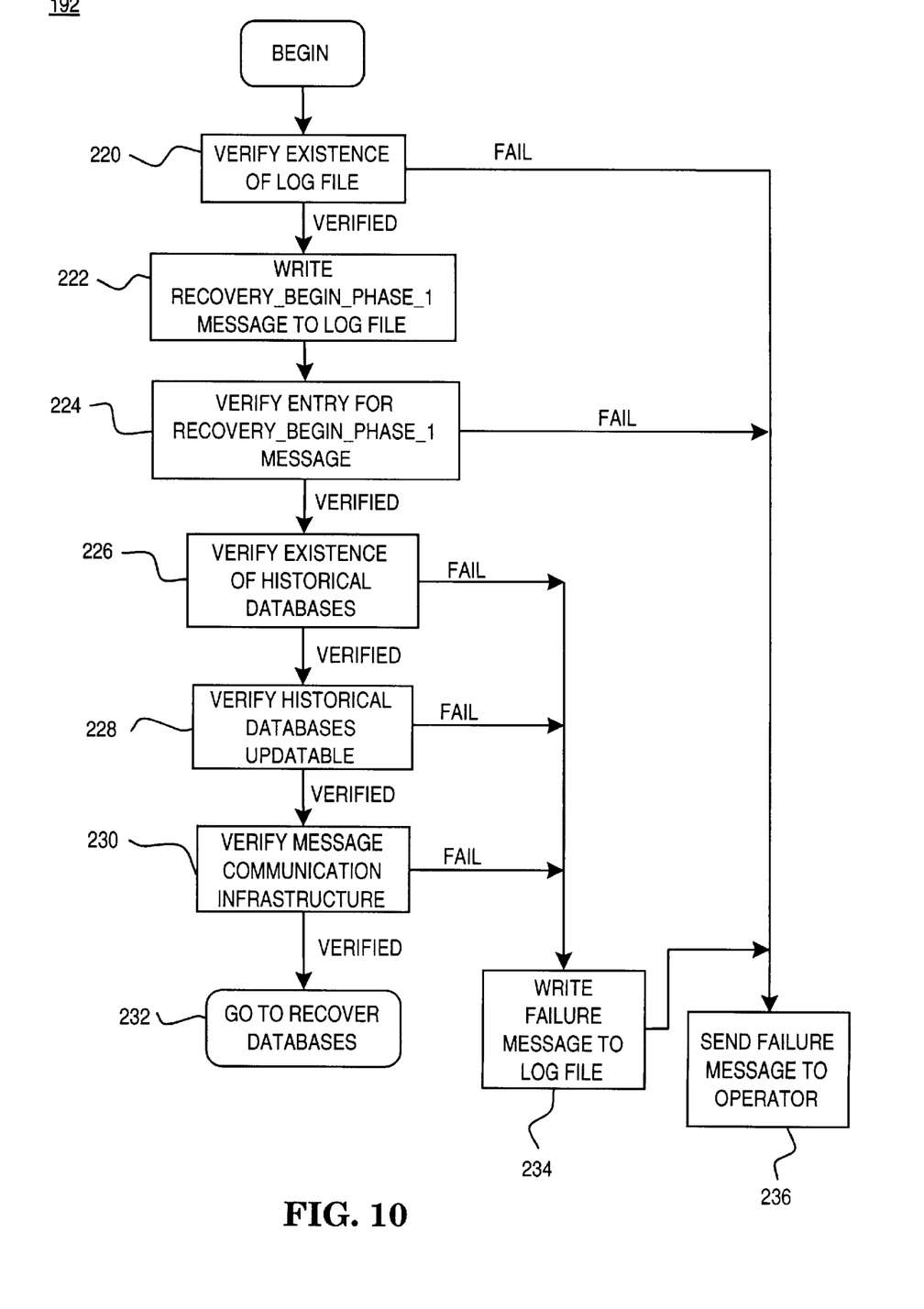
FIG. 10 is a flow diagram of the Validation phase of the recovery method of FIG. 9.

The first phase of recovery procedure 190 is Validate 192, which is illustrated in FIG. 10. The first step of the Validate phase 192 is to "Verify the existence of the log" 220 wherein the engine 20 locates the log file 76 in non-volatile memory. The address of the log file 76 is stored in a predetermined location in the database 21. If the engine is unable to locate the log file 76, then it will send a message to the system operator and fail.

Next, the engine 20 performs the "Write Recovery Begin Phase_1 log message" step 222 followed by "Verify Recovery_Begin_Phase_1 log message properly logged" 224. If the engine is unable to verify that the message was written to the log file 76, then it again sends a message to the system operator and fails.

The engine 20 then goes on to "Verify existence of database" 226 and "Verify proper updatability of database" 228. These steps determine that the database 21 is still intact and accessible to the engine 20. If either of these steps fail, then engine 20 writes a failure message to the log file 76 and then sends a message to the operator.

The final step to the Validate 192 phase is to "Verify the communication infrastructure" 230, wherein the engine 20 confirms that is has communication with the various business objects and resources in the system. Failure of this step will result in logging a failure message in log file 76 and sending a failure message to the system operator.

If any one of these tests in the Validate 192 phase fail, then the system is considered to be severely damaged, because the system state and data preceding the system crash cannot be recovered.

Figure 11:
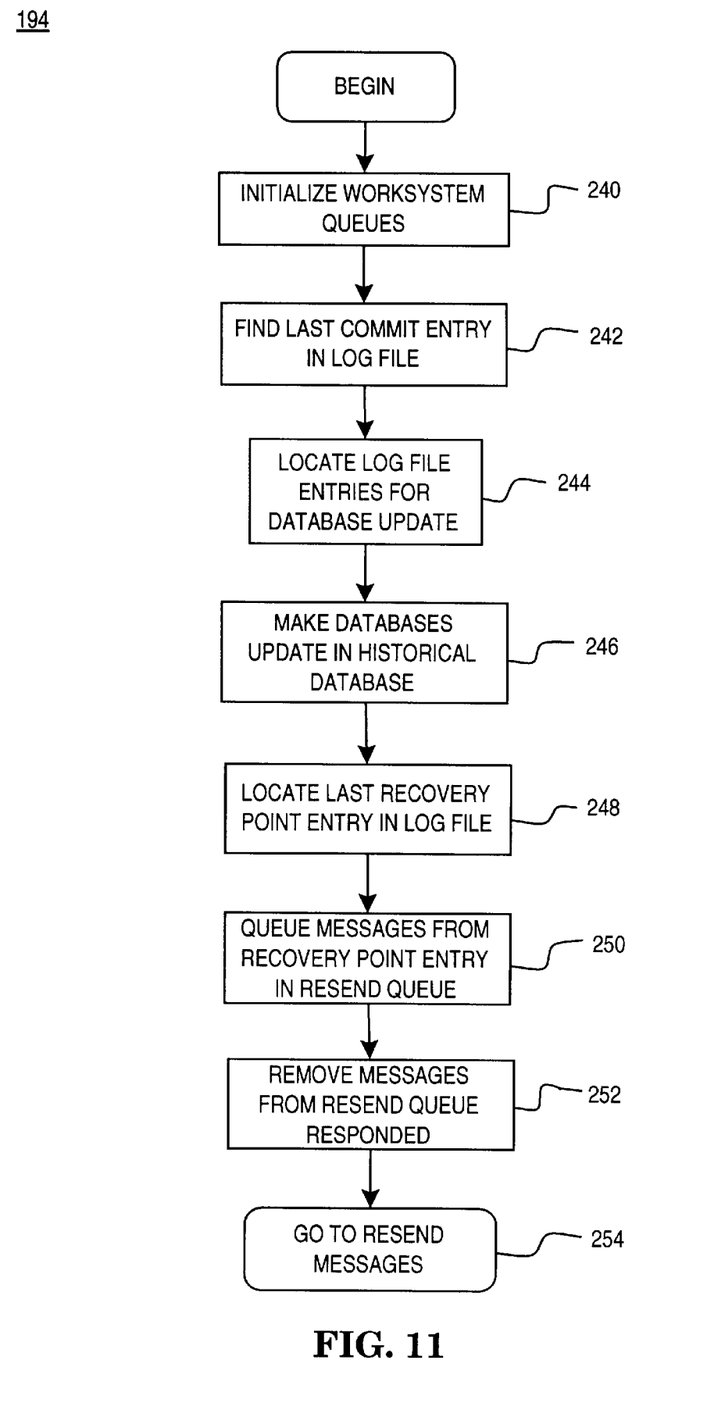
FIG. 11 is a flow diagram of the Recover Database phase of the recovery method of FIG. 9.

If the Validate phase 192 is successful, the engine 20 moves on to the Recover Database phase 194 shown in FIG. 11. First, the engine initializes all system queues from their values stored in the database 21. Next, the engine finds the last Commit point entry in log file 76. Starting from the last Commit point, the engine 20 rolls forward in log file 76 reexecuting the database updates recorded in the log file 76 in the current data in the object cache 75. The engine then queues all messages in the log file 76 for retransmittal in a resendQueue using the original message IDs. All intra-engine messages are then dequeued leaving only messages for transmittal to objects outside the engine. Then, the engine 20 dequeues any messages in resendQueue for which there is an entry for a response message in the log file 76. This process takes into account all messages in log file 76 until the Recovery_Begin_Phase_1 message is found in log file 76. Finally, the engine 20 commits the updates to the current data to database 21 and writes a Commit Point entry in the log.

Figure 12:
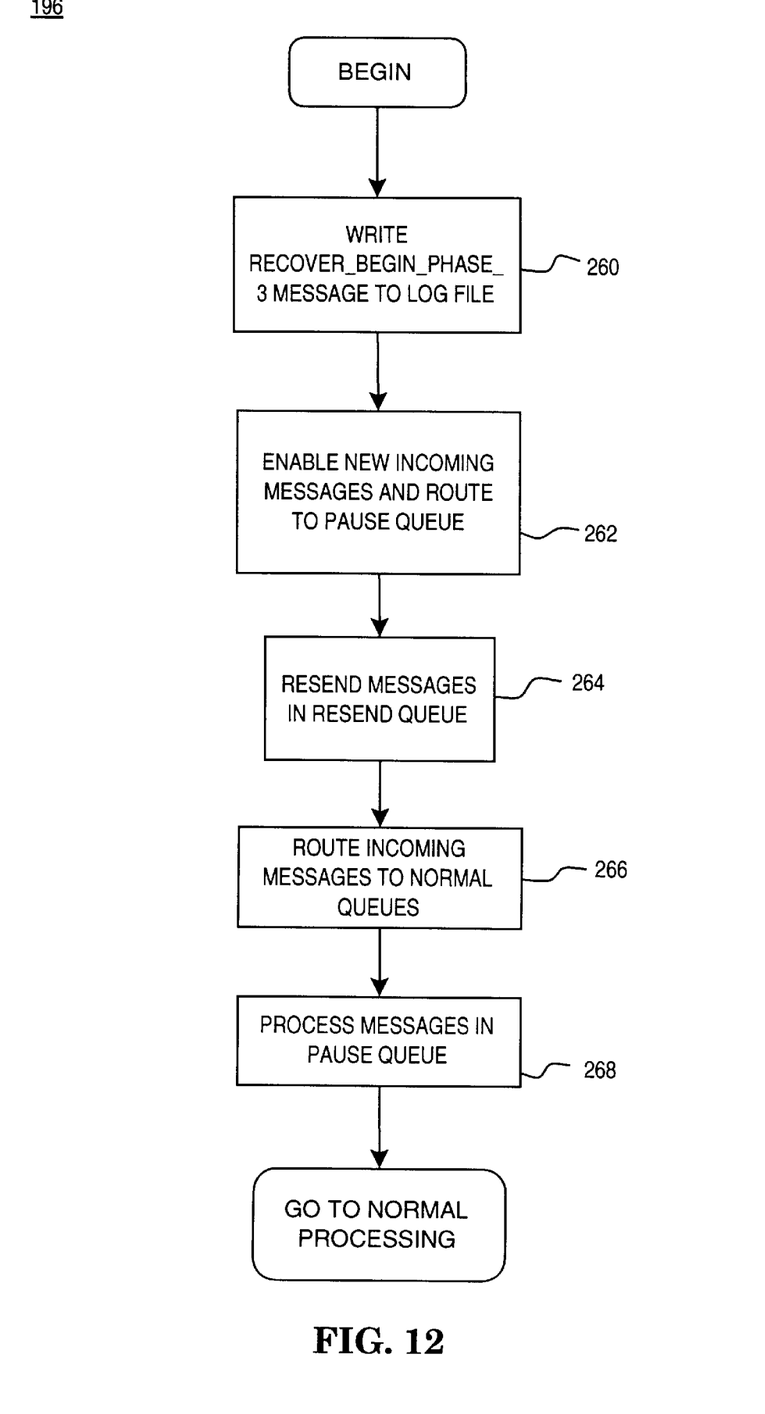
FIG. 12 a flow diagram of the Resend Messages phase of the recovery method of FIG. 9.

The third phase of recovery is the Resend Messages phase 196 shown in FIG. 12. The engine 20 first logs a Recovery_Begin_Phase_3 message in log file 76. This message includes the complete list of the IDs of the messages in the resendQueue. The engine 20 then opens to new incoming messages, but after logging them in the log file 76, the engine 20 queues them in the pause queue rather than their regular queue. The engine 20 then resends each message in the resendQueue. After resending the resendQueue messages, the engine 20 opens up further and incoming messages are routed to their normal queues rather than being deferred into the pause queue. The engine 20 then processes the messages deferred in the pause queue.

Figure 13:
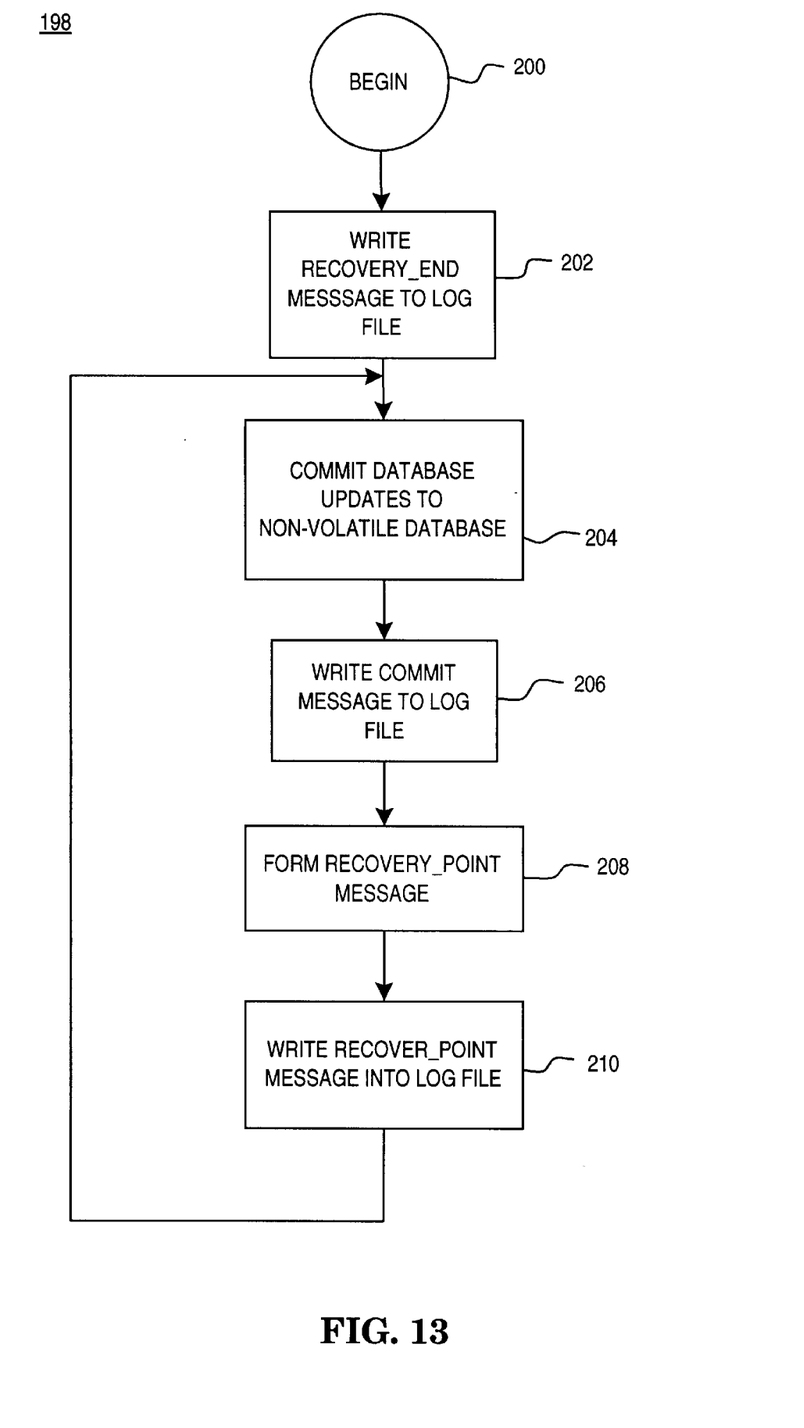
FIG. 13 is a flow diagram of the Normal Processing phase of the recovery method of FIG. 9.

Note that not all messages in the system will be processed by the engine 20 in FIFO order. Therefore, if it is important to avoid the non-FIFO behavior, i.e. if the objects do not tolerate out of order messages, then the engine should not be opened to incoming messages until the beginning of the Normal Processing phase 198.

Upon entering the Normal Processing phase 198, shown in FIG. 13, the engine 20 logs a Recovery_End message in log file 76. The engine 20 then enters the normal operating state of the system wherein it periodically commits the updates to current data in object cache 75 to the database 21 and logs a Commit point message in log file 76.

The previous discussion showed how to perform recovery when all engine 20 queues reside in the non-volatile database 21 and the main problem is recreating any database updates not committed before a failure. The recovery algorithms can be extended to cover the case where some or all of the system processing queues are transient data not stored in database 21.

To accommodate non-persistent (volatily stored) system queues, the Recover Database phase 194 must include step 248 wherein the engine locates the last Recovery point entry in log file 76. Then, the engine 20 initializes the resend-Queue with the messages listed in the Recovery point entry. The rest of the Recover Database phase 194 proceeds as described above wherein messages are dequeued if the log file 76 includes a reply message entry and the database 21 is committed.

The Resend Messages phase 196 must also include a step of logging a Recovery point message that includes the complete list of IDs of the messages in the resendQueue to permit the queue to be recovered in the event of another system crash during recovery. To support the recovery, the Normal Processing phase 198 must periodically execute a step 208 of forming a Recovery point message by gathering all the IDs of messages not fully processed and then logging 210 the Recovery point message in log file 76.

Having described and illustrated the principles of the invention in a particular embodiment thereof, it should be apparent that the invention can be modified in arrangement and detail, including multi-engine architectures and non-workflow databases, without departing from such principles.

What is claimed is:

1. A method for reliable high-speed access to a database system, comprising:

storing system data in a non-volatile database;

storing current data in an object cache, the current data reflecting at least a portion of the system data in the non-volatile database, the object cache providing the database system with the capability of querying and updating the current data; database and the object cache, wherein (1) each message contains historical and updating data of the current data and (2) the log file allows recovery of the database system in the event of a system failure by reconstructing the current data in the object cache, wherein no database commit is required in the log file or the database when the log file logs each message; and periodically committing the current data in the object cache to the non-volatile database.

2. The method of claim 1, wherein the step of periodically committing the current data further comprises the steps of searching for entries in the durable log file related to modifications in the current data in the object cache; and executing the same modifications found in the durable log file on the system data in the non-volatile database.

3. The method of claim 2, further comprising the step of marking current data in the object cache when the current data is updated.

4. The method of claim 1, wherein the step of periodically committing the current data in the object cache further comprises the step of:

inserting a commit entry in the durable log file when the current data in the object cache is committed to the non-volatile database;

periodically pruning the log file to remove entries which temporally precede the commit entry; and periodically pruning the log file to remove entries storing the removed entries in a historical database.

5. The method of claim 4, wherein a failure of the database system can be recovered by locating a most recent commit entry in the durable log file;

locating the entries in the durable log file related to modifications to the current data in the object cache which temporally follow the most recent commit entry; and performing the same modifications to the system data in the non-volatile database for each such entry found.

6. The method of claim 1, wherein the step of logging each message in the database system further comprises constructing the durable log file as a circular list; and the step of periodically committing the current data further comprises committing the current data in the object cache before the step of logging each message overwrites uncommitted entries in the durable log file.

7. The method of claim 1, further comprising:

periodically inserting a recovery point entry in the durable log file, wherein the recovery point entry includes identification numbers for all messages waiting in volatile message queues in the database system.

8. The method of claim 7, further comprising the step of recovering from a failure of the database system by locating a most recent recovery point entry in the durable log file;

forming a resend queue containing the messages identified in the recovery point entry;

searching the durable log file for entries subsequent to the most recent recovery point for reply messages corresponding to each of the messages in the resend queue;

removing the messages in the resend queue that have corresponding reply messages; and resending the messages remaining in the resend queue.

9. A database system configured to support a workflow process, comprising:

a non-volatile database configured to reside in non-volatile storage to support a data structure of the workflow process and to provide the workflow process with access to a first plurality of data elements;

a volatile database configured to support the data structure of the workflow process and to provide the workflow process with query and update access to a second plurality of data elements, the second plurality of data elements being related to a portion of the first plurality of data elements;

a non-volatile and non-database log file in a non-volatile memory separate from the databases to log, as an entry, each message generated in the database system, wherein (1) each message contains historical and updating data of the second plurality of data elements and (2) the log file allows recovery of the database system in the event of a system failure by reconstructing the second plurality of data elements in the volatile database, wherein no database commit is required in the log file or the database when the log file logs each message; and an engine configured to support the workflow process and to log an entry in the non-volatile log file for each message generated by the workflow process.

10. The database system of claim 9, wherein the engine is further configured to periodically commit the second plurality of data elements to the first plurality of elements by searching for entries in the non-volatile log file related to update transactions on the second plurality of data elements and reexecuting the entries on the first plurality of data elements.

11. The database system of claim 10, wherein the engine is further configured to insert a commit entry in the non-volatile log file to indicate which entries in the non-volatile log file have been committed.

12. The database system of claim 11, wherein the engine is further configured to recover from failure by locating a most recent commit entry in the non-volatile log file, to identify the entries in the non-volatile log file related to update transactions on the second plurality of data elements that are subsequent to the most recent commit entry, and to reexecute the identified entries on the first plurality of data elements.

13. The database system of claim 10, wherein the engine is further configured to periodically insert a recovery point entry in the log file, wherein the recovery point entry includes identification numbers for all messages waiting in volatile message queues in the engine.

14. The database system of claim 13, wherein the engine is further configured to recover from failure by locating a most recent recovery point entry in the non-volatile log file, to form a resend queue containing messages with identification numbers from the most recent recovery point entry, to remove messages from the resend queue that have corresponding reply message entries in the non-volatile log file, and to resend the messages on the resend queue.

* * * * *